US008733139B2

(12) United States Patent
Pickar

(10) Patent No.: US 8,733,139 B2
(45) Date of Patent: May 27, 2014

(54) VEHICLE DOOR HANDLE HARDWARE ASSEMBLY

(75) Inventor: Barbara J. Pickar, New Hampton, IA (US)

(73) Assignee: Trimark Corporation, New Hampton, IA (US)

( * ) Notice: Subject to any disclaimer, the term of this patent is extended or adjusted under 35 U.S.C. 154(b) by 188 days.

(21) Appl. No.: 13/308,422

(22) Filed: Nov. 30, 2011

(65) Prior Publication Data

US 2013/0133384 A1 May 30, 2013

(51) Int. Cl.
*B60R 25/02* (2013.01)

(52) U.S. Cl.
USPC .................. 70/208; 292/336.3; 292/DIG. 30; 292/DIG. 31

(58) Field of Classification Search
USPC .................. 70/208–211; 292/336.3, DIG. 30, 292/DIG. 31
See application file for complete search history.

(56) References Cited

U.S. PATENT DOCUMENTS

| | | | | |
|---|---|---|---|---|
| 3,651,673 | A * | 3/1972 | Sendrowski et al. | 70/450 |
| 4,320,642 | A * | 3/1982 | Pastva, Jr. | 70/472 |
| 4,736,972 | A | 4/1988 | Mosch | |
| 4,838,054 | A | 6/1989 | Weinerman et al. | |
| 4,841,755 | A * | 6/1989 | Weinerman et al. | 70/208 |
| 5,263,346 | A | 11/1993 | Sato et al. | |
| 5,606,882 | A | 3/1997 | Larsen et al. | |
| 5,820,175 | A | 10/1998 | Clavin | |
| 5,852,943 | A | 12/1998 | Dutka et al. | |
| 5,927,773 | A | 7/1999 | Larsen et al. | |
| 6,023,953 | A * | 2/2000 | Vickers et al. | 70/208 |
| 6,145,352 | A * | 11/2000 | Vickers et al. | 70/208 |
| 6,409,234 | B1 | 6/2002 | Larsen et al. | |
| 6,604,393 | B2 * | 8/2003 | Larsen et al. | 70/208 |
| 6,708,537 | B1 | 3/2004 | Eschweiler et al. | |
| 7,383,707 | B2 | 6/2008 | Yamada et al. | |
| 7,603,881 | B2 | 10/2009 | Yukihara et al. | |
| 7,752,877 | B2 | 7/2010 | Burns | |
| 8,186,191 | B2 * | 5/2012 | Bacon | 70/208 |
| 8,347,667 | B2 * | 1/2013 | Bacon | 70/107 |
| 8,393,187 | B2 * | 3/2013 | Bacon | 70/107 |
| 2002/0163205 | A1 * | 11/2002 | Sekulovic | 292/163 |
| 2010/0154489 | A1 * | 6/2010 | Bacon | 70/77 |

(Continued)

OTHER PUBLICATIONS

Bauer Products: Item No. BP-12, [retrieved from the Internet on Nov. 21, 2011 from http://www.bauerproducts.com/allproducts.php?ProductProduct=p13298&ProductCategory=], 1 page.

(Continued)

*Primary Examiner* — Suzanne Barrett
(74) *Attorney, Agent, or Firm* — McKee, Voorhees & Sease, P.L.C.

(57) ABSTRACT

The vehicle door hardware assembly includes exterior and interior housings each having a handle or paddle for opening the door. The outer housing includes a plunger which is normally extended, and can be retracted by either the exterior or interior handle when the door is unlocked. A deadbolt is also provided on the exterior housing. A main lock can be slid between locked and unlocked positions to preclude or allow movement of the paddle. A pair of key cylinders is provided on the exterior housing for actuating the deadbolt and the main lock. Power units can be connected to the lock and deadbolt via actuators. The deadbolt and lock are also movable by a pair of knobs on the inside housing.

28 Claims, 30 Drawing Sheets

(56) References Cited

U.S. PATENT DOCUMENTS

| | | | | |
|---|---|---|---|---|
| 2011/0126598 | A1* | 6/2011 | Bacon | 70/77 |
| 2012/0174633 | A1* | 7/2012 | Bacon | 70/77 |
| 2012/0192602 | A1* | 8/2012 | Bacon | 70/278.1 |

OTHER PUBLICATIONS

TriMark 060-0600 Motor Home Entrance Door Hardware 060-0650 Dead Bolt Option, TriMark Corporation, New Hampton, Iowa, 1 page.

* cited by examiner

VEHICLE DOOR HANDLE HARDWARE ASSEMBLY

BACKGROUND OF THE INVENTION

Hardware for vehicle door handles come in numerous configurations. For motor home and recreational vehicle doors, the hardware is typically different than on automobiles and trucks. For example, on a motor home door, the door panel is sandwiched between interior and exterior handle housings, with pivotal exterior and interior handles or paddles to retract the plunger or rotate a rotary latch for opening the door. Locks are provided on the handle assembly to lock the exterior paddle so that the door cannot be opened by unauthorized personnel. Generally, there is a main door lock with a dead bolt optionally provided for extra security. Current motor home and RV door handle assemblies have several drawbacks. One shortcoming of conventional handle assemblies is the lack of a power lock for the deadbolt, due primarily to space and dimensional limitations. Also, standard motor home door hardware prevents the door from being closed when the lock cylinder is in the locked condition, since the plunger bolt will not retract when the door is locked. Also, the plunger channel in the housing is relatively thick to meet load requirements, which complicates manufacture of the housing, particularly for die cast processes.

Therefore, the primary objective of the present invention is the provision of improved hardware for a door handle assembly which overcomes the problems and limitations of the prior art.

Another objective of the present invention is the provision of a motor home door hardware assembly which allows the main lock and/or deadbolt to be actuated with a power lock actuator.

Still another objective of the present invention is the provision of an RV door handle assembly having a slidable lock which, when locked, allows the door to be closed.

Yet another objective of the present invention is the provision of a vehicle door handle assembly having a lock which blocks the inside and outside handles from actuation when the door is locked.

Still another objective of the present invention is the provision of an improved door handle assembly for a motor home or RV having reinforcement plates under the load pins and through which the plunger moves so as to reduce the mass of the plunger channel in the hardware housing.

A further objective of the present invention is the provision of an improved door handle assembly for a motor home or RV which is durable in use, and which provides enhanced features for the vehicle door and user.

These and other limitations will become apparent from the following description of the invention.

SUMMARY OF THE INVENTION

The improved door handle assembly of the present invention is intended for use on motor homes, RVs and similar vehicles. The assembly includes inner and outer housings between which the door handle is sandwiched. A plunger and a deadbolt are mounted in the outside housing for movement between extended and retracted positions. Interior and exterior handles are pivotally mounted on the outside and inside housings, respectively, and are connected to the plunger to move the plunger from the extended position to the retracted position. The plunger is biased to the extended position. A main handle lock is slidably mounted on the outside housing and is moveable between locked and unlocked positions.

When the door is closed and the lock is in an unlocked position, the handles can be used to retract the plunger and thereby open the door. When the door is closed and the lock is in the locked position, the handles cannot be actuated to retract the plunger, thereby maintaining the door in a closed position. When the door is open, and the handle lock is in the locked position, the handles cannot be actuated, but the plunger will temporarily retract when the door is closed or slammed shut, after which the door remains locked. The deadbolt is actuated after the door is closed.

The outside housing of the handle assembly has one or more steel reinforcement plates mounted to the outside housing under the load pins through which the plunger moves between the retracted and extended positions. The plates allow the plunger channel to be formed with a minimum of material and mass, which facilitates manufacture of the housing.

The door handle assembly also includes a rotatable actuator for the lock of the inside and outside, i.e., the handles or main door lock, and another rotatable actuator for the deadbolt, such that power lock actuators can be used on either or both the main lock and the deadbolt. Preferably, the lock and deadbolt actuators are identical in design, and allow multiple hookups or configurations for the power lock actuator locations. Also, the actuators for the handles and the deadbolt prevent the lock cylinders from being removed when a non-master keyed lock cylinder is in the locked position. The identical actuators also allow identical lock cylinders to be used for both the plunger and the deadbolt, such as the Key One Lock Cylinder of TriMark Corporation described in U.S. Pat. No. 5,606,882.

BRIEF DESCRIPTION OF THE DRAWINGS

FIG. 1A is a perspective view of the assembly;

FIG. 1B is a plan view from the exterior side of the assembly;

FIG. 1C is a plan view from the interior side of the assembly;

FIG. 1D is a view from the right end of the assembly as seen in FIG. 1B;

FIG. 1E is a sectional view taken along lines E-E of FIG. 1B;

FIG. 1F is a sectional view taken along lines F-F of FIG. 1B;

FIG. 1G is a sectional view taken along lines G-G of FIG. 1B;

FIG. 1H is a plan view of the components on the outer housing, with the cover plate removed for clarity.

FIG. 2A is a plan view of the assembly from the exterior side;

FIG. 2B is a plan view from the interior side of the assembly;

FIG. 2C is a plan view of the components on the outside housing, with the cover plate removed for clarity;

FIG. 2D is an end view of the assembly as seen from FIG. 2A;

FIG. 2E is a sectional view taken along lines E-E of FIG. 2A;

FIG. 2F is a sectional view taken along lines F-F of FIG. 2A.

FIGS. 13A and 13B are perspective views of the actuator;

FIG. 13C is a plan view of the actuator;

FIGS. 13D and 13E are side views of the actuator.

FIGS. 14A and 14B are perspective views;

FIG. 14C is a plan view;

FIGS. 14D and 14E are side elevation views.

DETAILED DESCRIPTION OF THE PREFERRED EMBODIMENTS

Figure 1A:
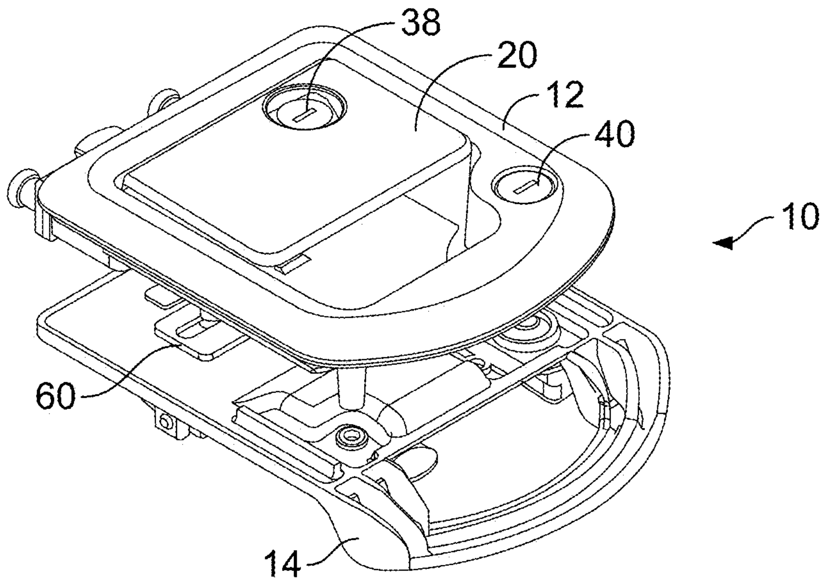
FIGS. 1A-1H show the vehicle door hardware assembly of the present invention in an unlocked condition, with the plunger extended and the deadbolt retracted. More particularly.
Figure 1B:
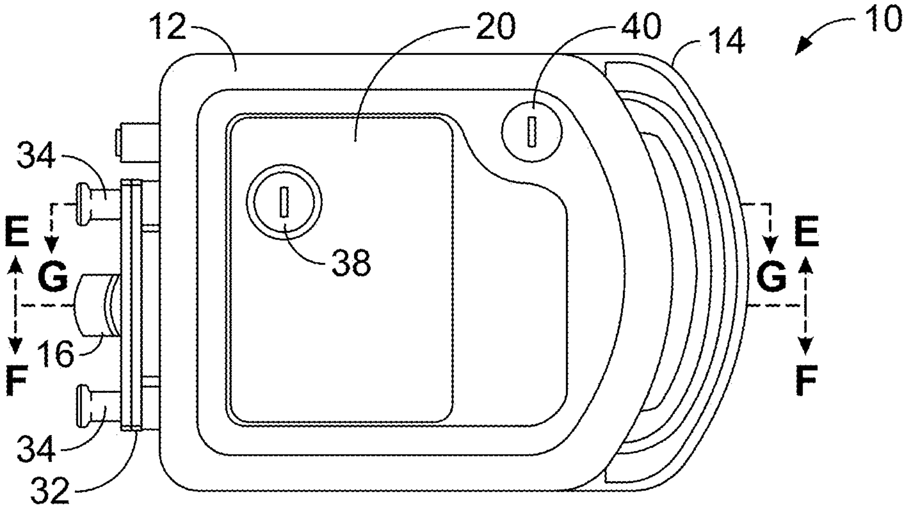
Figure 1C:
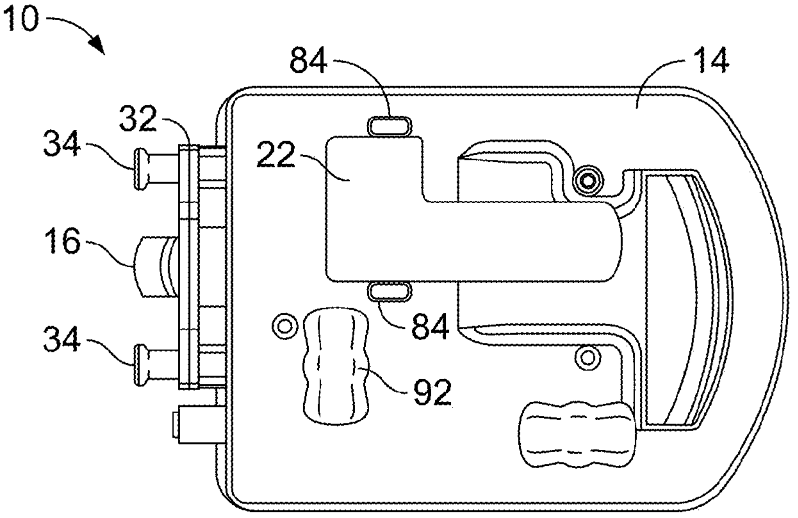
Figure 1D:
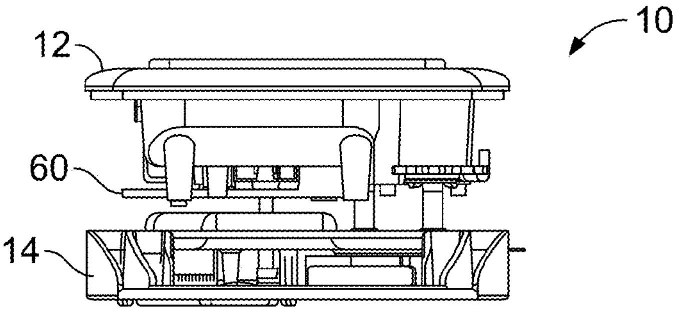
Figure 1E:
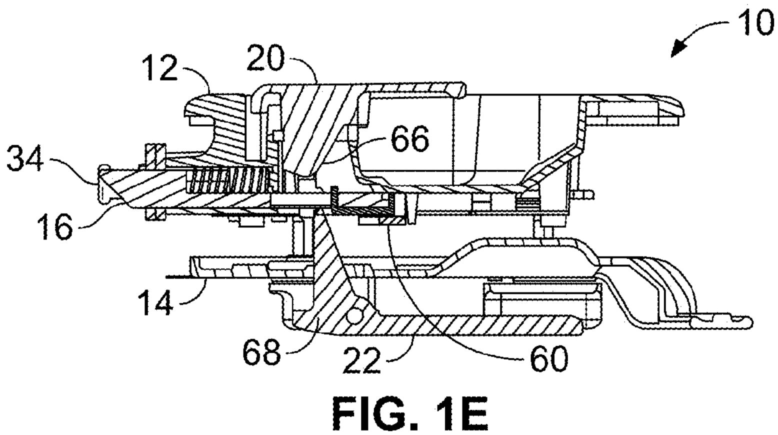
Figure 1F:
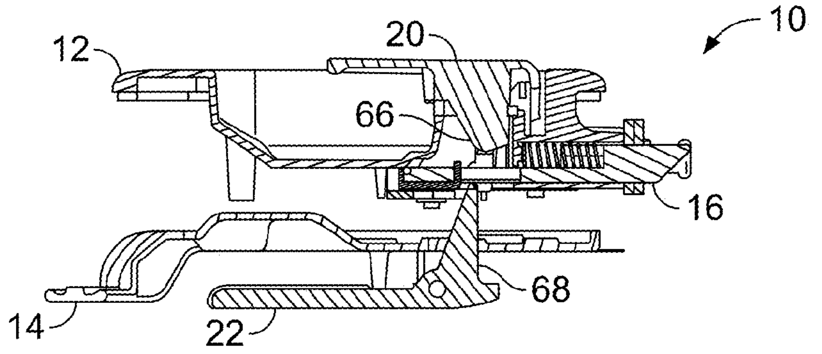
Figure 1G:
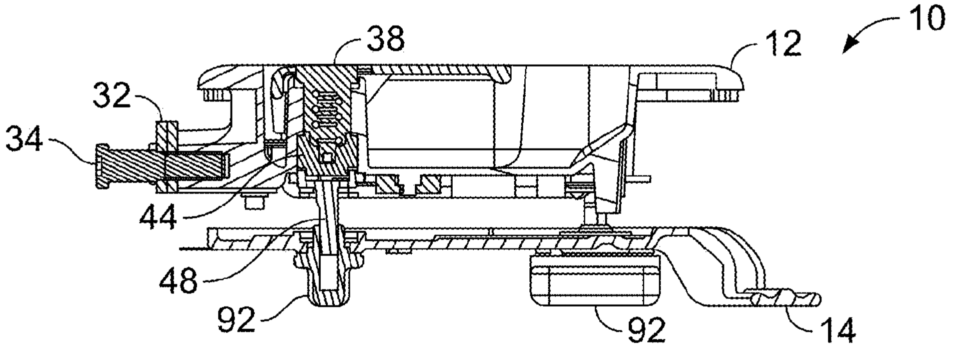

The door handle assembly of the present invention is generally designated in the drawings by the reference numeral 10. The assembly 10 includes an outer housing 12 and an inner housing 14. The housings 12, 14 are clamped together by threaded fasteners extending through the inside housing 14 and into bosses on the outside housing 12, with the door sandwiched between the housings 12, 14. When the assembly is mounted on a vehicle door, the housing is recessed in a door cutout so as to be substantially flush with the outer door surface, respectively.

The assembly 10 also includes a plunger 16 and a deadbolt 18. An exterior handle or paddle 20 is pivotally mounted to the outer housing 12, while an inner handle 22 is pivotally mounted to the inner housing 14. The handles 20, 22 are operatively connected to the plunger 16 to move the plunger between extended and retracted positions.

Figure 3:
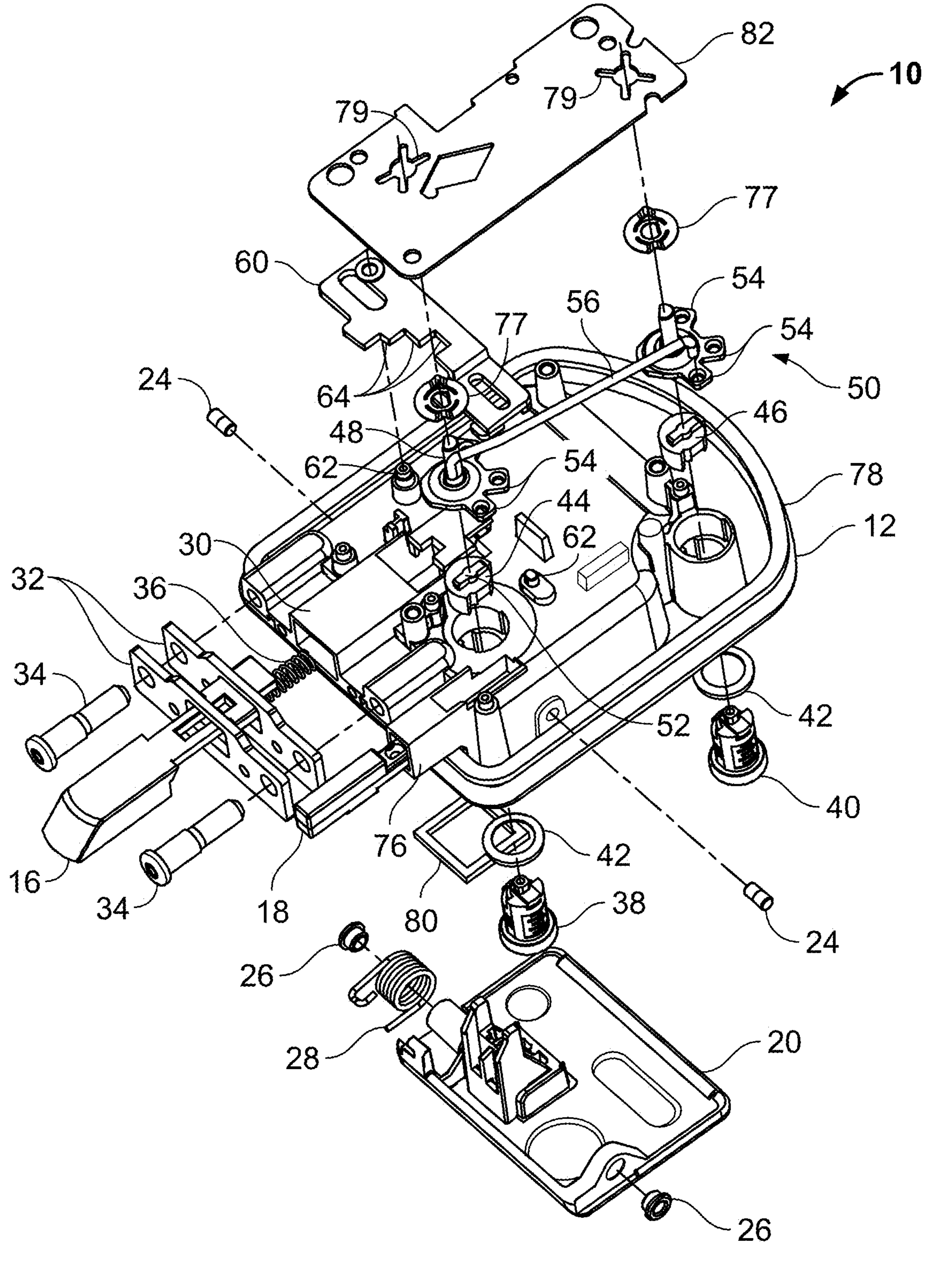
FIG. 3 is an exploded view of the components mounted on the outer housing.
Figure 4A:
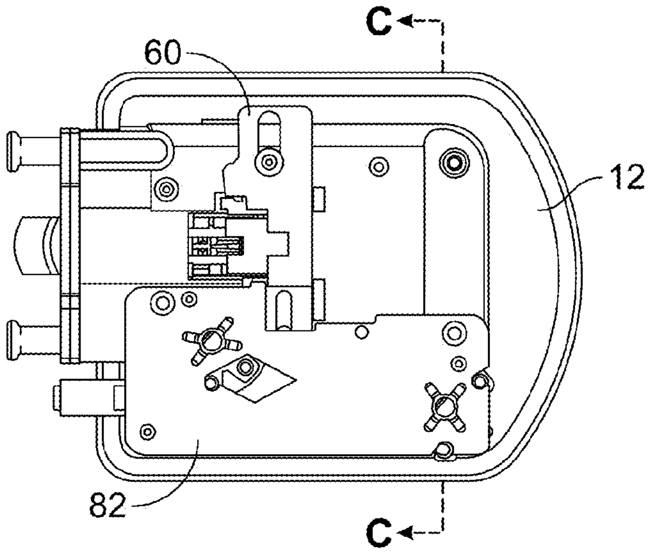
FIG. 4A is a view similar to FIG. 1H, with the cover plate included.
Figure 4B:
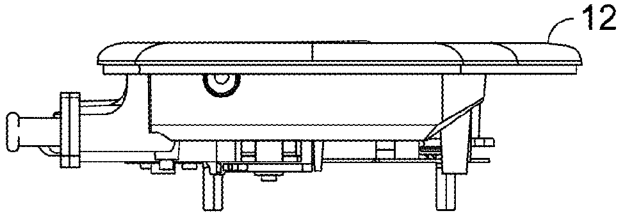
FIG. 4B is a side elevation view of the outer housing.
Figure 4C:
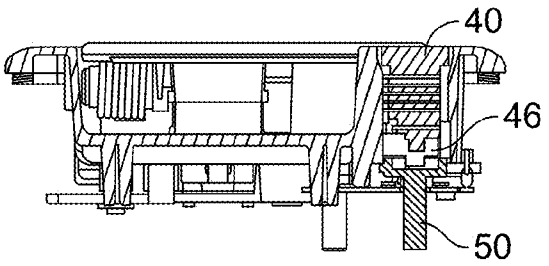
FIG. 4C is a sectional view taken along lines C-C of FIG. 4A.
Figure 5A:
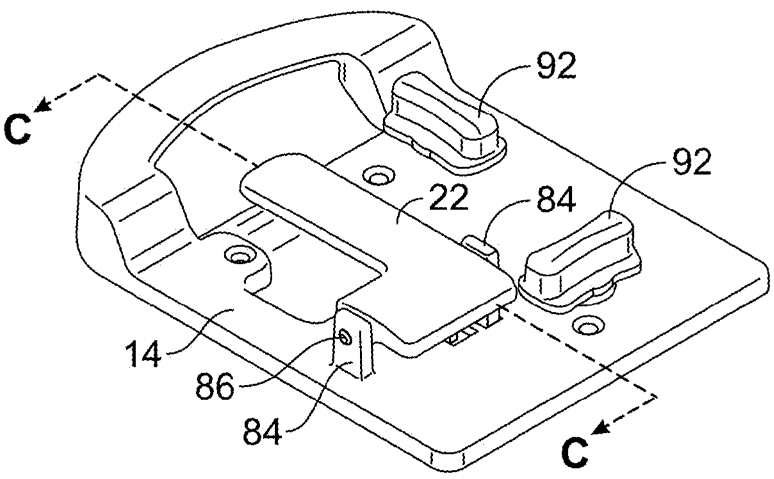
FIG. 5A is a perspective view of the inside housing.
Figure 5B:
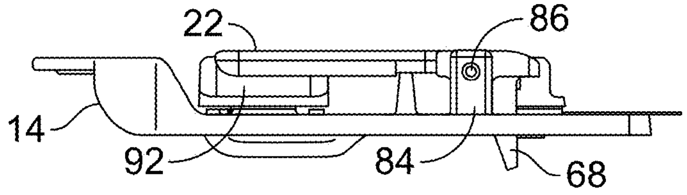
FIG. 5B is a side elevation view of the inside housing.
Figure 5C:
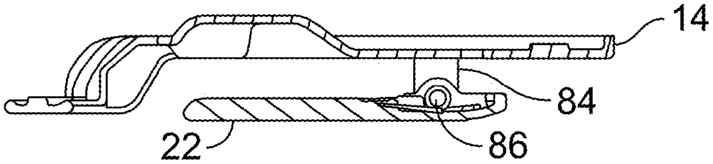
FIG. 5C is a sectional view taken along lines C-C of FIG. 5A.

The details of the various components associated with the outer housing 12 are best seen in the exploded view of FIG. 3. The outer paddle 20 is mounted to the outer housing 12 via pins 24 and bushings 26, which extend through aligned apertures on the housing 12 and the handle 20. A spring 28 is mounted on the paddle 20 to normally bias the paddle to a neutral or rest position.

The plunger 16 has an inner end which is received in a plunger channel or tunnel 30 formed in the outer housing 12. One or more steel reinforcement plates 32 are secured to the end of the housing 12 using load bolts 34. The plates 32 have a central opening through which the plunger 16 slidably extends. A spring 36 is captured into channel 30 to normally bias the plunger 16 to the extended position. The plates 32 minimize the material and mass of the walls of the channel 30, thereby simplifying the die case manufacturing process for the housing 12.

First and second key cylinders 38, 40 are mounted in the housing 12 in manners well known in the art. A gasket or seal 42 is provided for each key cylinder 38, 40 to prevent or minimize migration of moisture from outside the housing 12 to inside the housing 12. First and second cylinder actuators 44, 46 are mounted on the inner ends of the cylinders 38, 40, respectively. A rotatable lock actuator 48 is mounted onto the cylinder actuator 44, and a rotatable deadbolt actuator 50 is mounted on top of the cylinder actuator 46. The actuators 48 and 50 have identical construction. More particularly, a projection 52 on each actuator 44, 46 is received in a recess 51 in the respective actuators 48, 50. The sidewall of each actuator 44, 46 includes a notch or cutout 55 which receives a leg 53 on each actuator 48, 50, which allows the actuators 48, 50 to rotate with respect to the actuators 44, 46 approximately 98°.

Figure 1H:
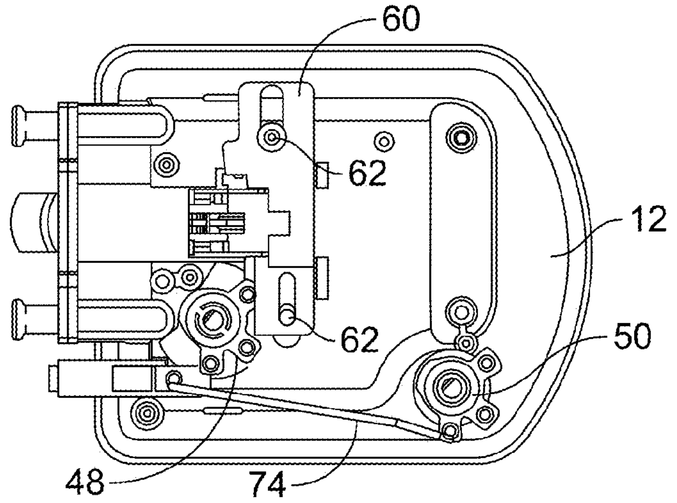
Figure 2A:
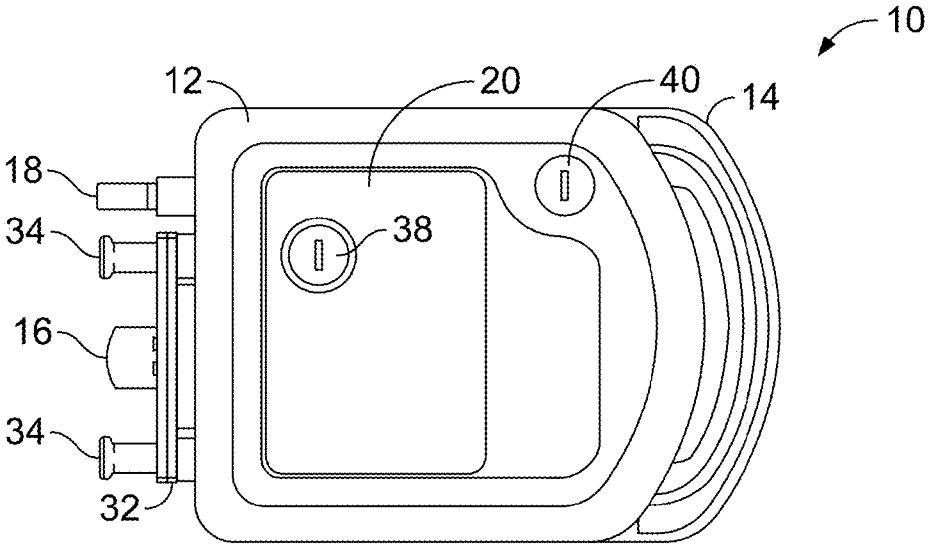
FIGS. 2A-2F show the assembly in a locked condition, with the plunger extended and the deadbolt extended. More particularly.
Figure 2B:
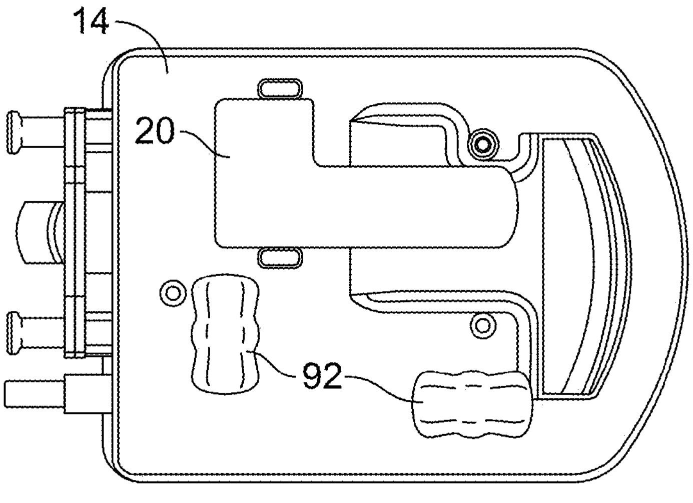
Figure 2C:
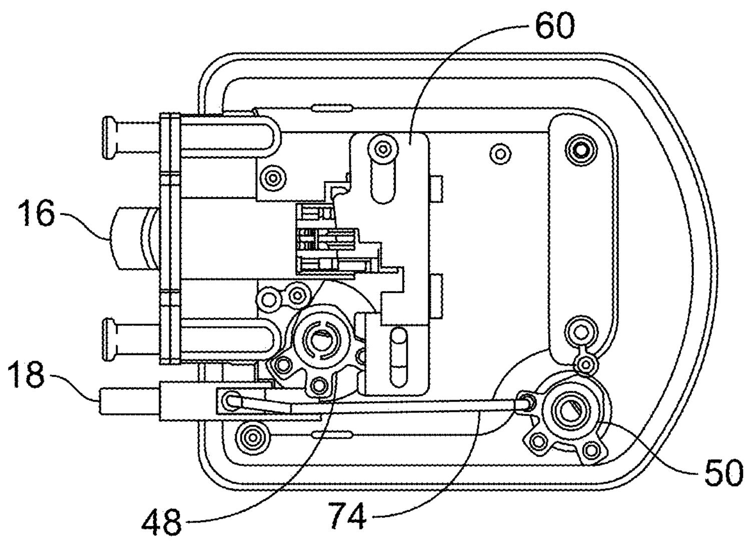
Figure 2D:
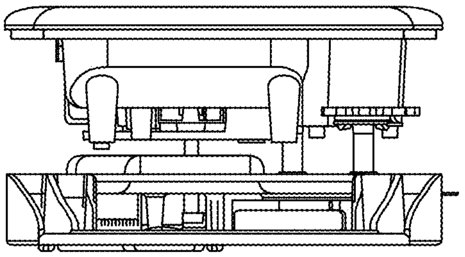
Figure 2E:
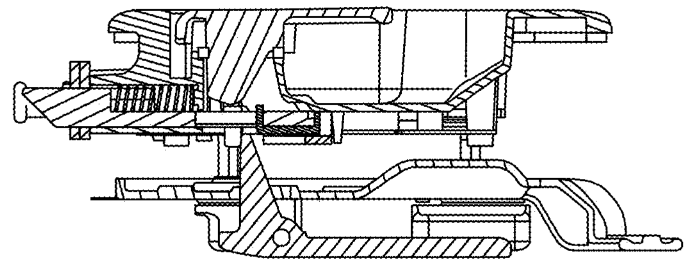
Figure 2F:
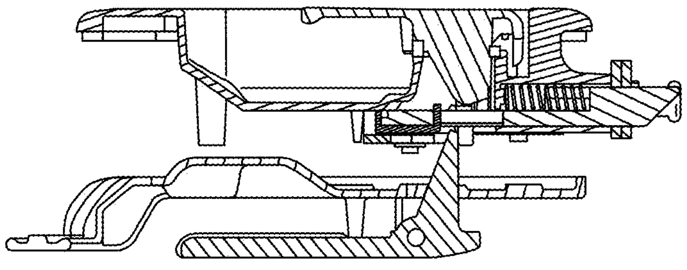

The lock actuator 48 has three tabs 54, each of which has a hole, two of which are accessible for receipt of the end of a rod 56 connected to a power unit 58. The end of the rod 56 can be selectively received in the hole in two of the tabs 54, depending upon the location or orientation of the power unit 58. The actuator 48 is also associated with a slidable lock arm 60 which has an elongated slot at each end for sliding receipt over posts 62 on the housing 12. When the actuator 48 is rotated, either by a key in the cylinder 38, actuation of the power unit 58 or rotation of the interior knob 92, or by rotation of an inside knob 92 (described below), the lock 60 slides between a locked position (FIG. 1H) and an unlocked position (FIG. 2C). When the slide lock 60 is in the unlocked position, the outer handle 20 and inner handle 22 are pivotal to retract the plunger 16 so that the door can be opened from a closed position. The lock arm 60 overlies one of the tabs 54 of the actuator 48 to preclude connection of the rod 56 to the covered tab. When the slide lock 60 is in a locked position, the handles 20, 22 are blocked against movement, and thus will not retract the plunger 16 so that the door cannot open. The lock arm 60 blocks or unblocks the handles 20, 22 through a series of notches or steps 64. The outer handle 20 includes a pair of legs 66 which extend through the housing 12. Similarly, the inner handle 22 includes one or more legs 68 which extend through the housing 14. When the lock 60 is in the unlocked position, the steps 64 are disengaged from the legs 66, 68, and when the lock 60 is in the locked position, the steps 64 engage the legs 66, 68 to preclude movement of the handles 20, 22.

The deadbolt actuator 50 has an identical construction to the plunger actuator 48. A power unit 70 is provided in the door and is connected to the actuator 50 by a rod 72 extending between the power unit 70 and one of the three tabs 54. A secondary rod 74 extends between the actuator 50 and the deadbolt 18. Thus, when the actuator 50 is rotated by a key in the cylinder 40, by actuation of the power unit 70, or by rotation of the interior knob 92, the deadbolt 18 is extended or retracted within a deadbolt channel or tunnel 76 formed on the outer housing 12.

Each actuator 48, 50 includes a D-shaped post. A spring 77 is press fit on each post 75. Each spring 77 has a wave which fits into a cross-shaped cutout 79 in a cover plate 82 at the locked and unlocked positions of the actuators 48, 50. The spring 77 provides resistance as the actuators 48, 50 are rotated between the locked and unlocked positions as the spring waves are forced out of the cross-shaped cutouts 79 and slide under the cover plate 82. The receipt of the spring waves in the cover plate cutouts 79 preclude the actuators 48, 50 from rattling different positions or turning too easily from the locked or unlocked positions.

As seen in FIG. 3, a perimeter gasket 78 is preferably provided around the inner edge of the housing 12. Another gasket 80 is preferably provided between the handle 20 and the housing 12 to seal around the legs 66 of the handle 20. Also, a cover plate 82 is secured to the housing 12 in any convenient manner to retain certain components in position on the housing 12.

Figure 6:
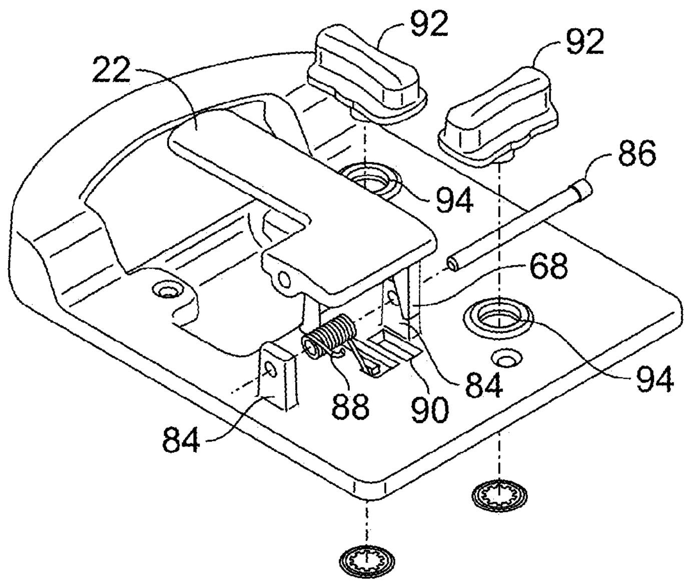
FIG. 6 is an exploded view of the inside housing and associated components.
Figure 7:
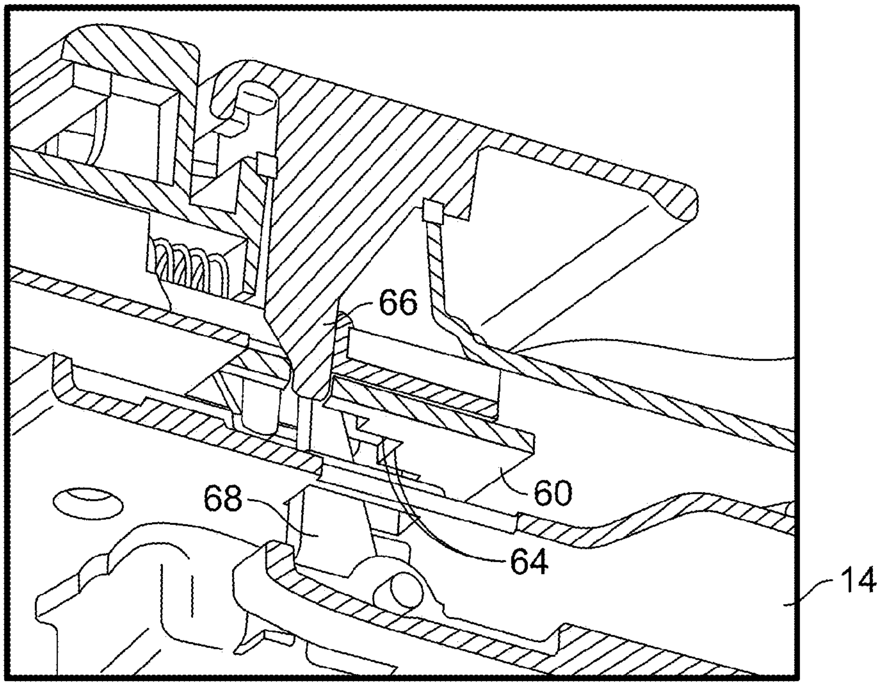
FIG. 7 is a perspective sectional view of the assembly with the lock plate in a locked position.
Figure 8A:
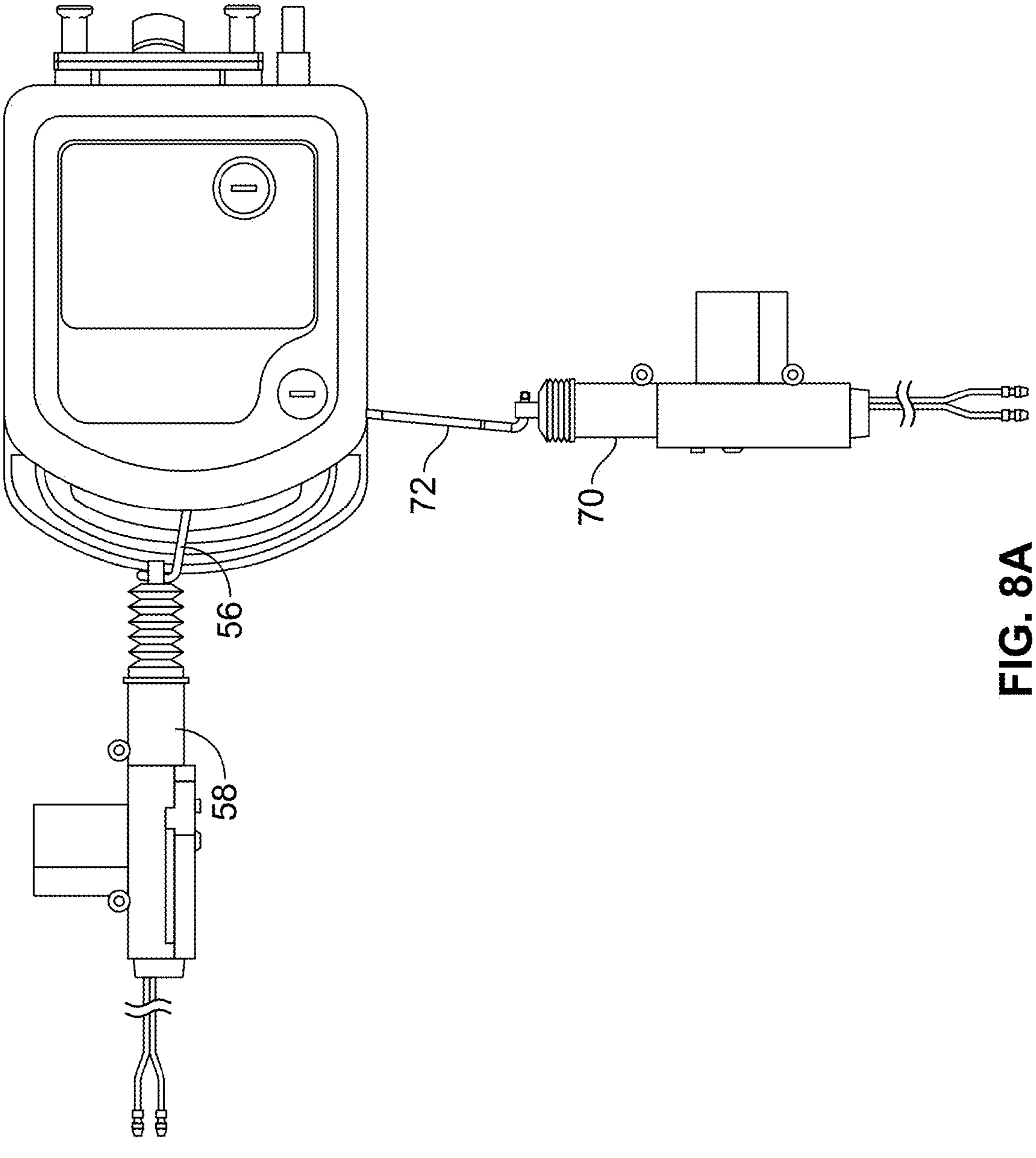
FIGS. 8A-8G show the door hardware assembly with power lock actuators attached for locking and unlocking the assembly, and with the plunger and deadbolt both extended.
Figure 8B:
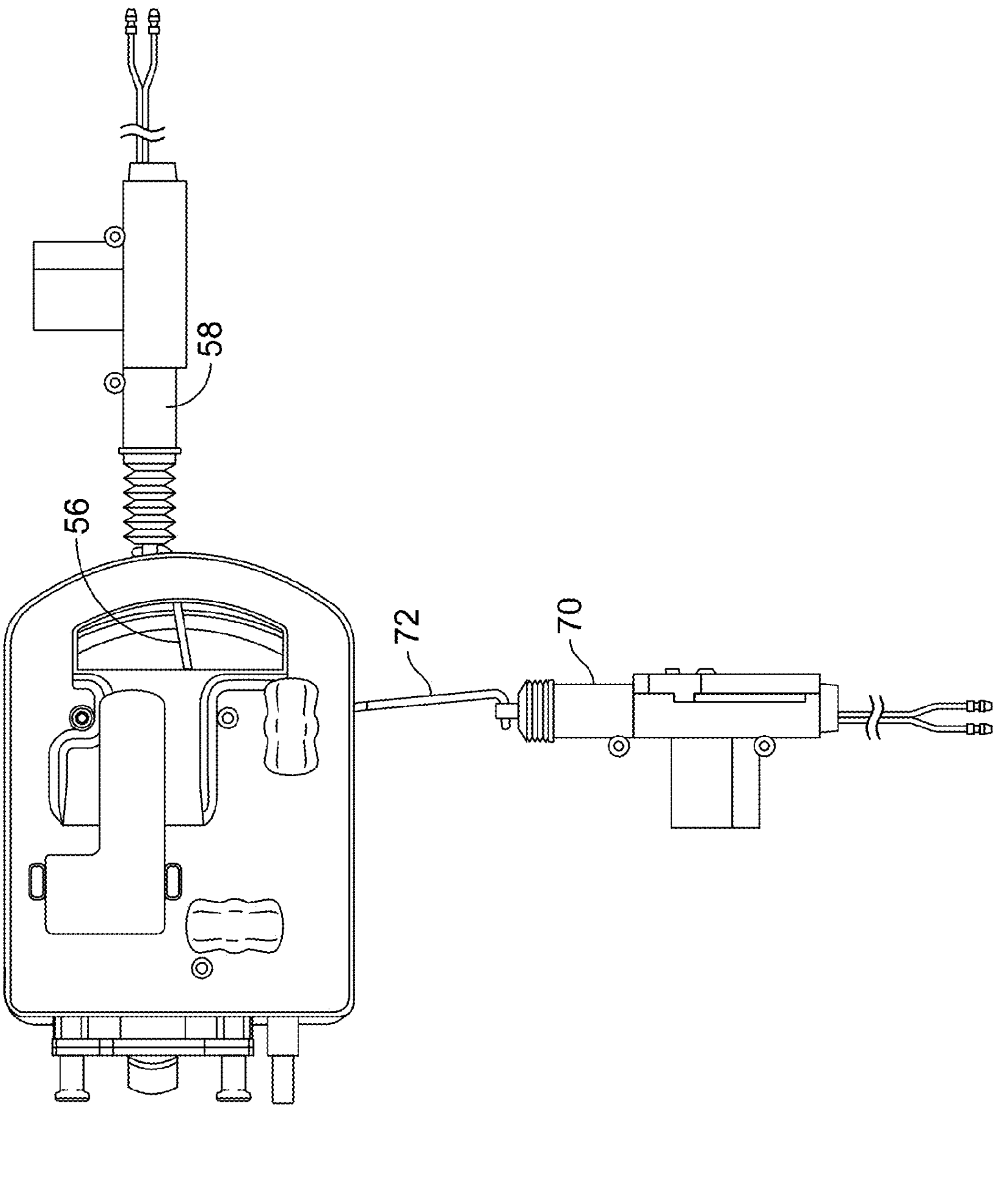
Figure 8C:
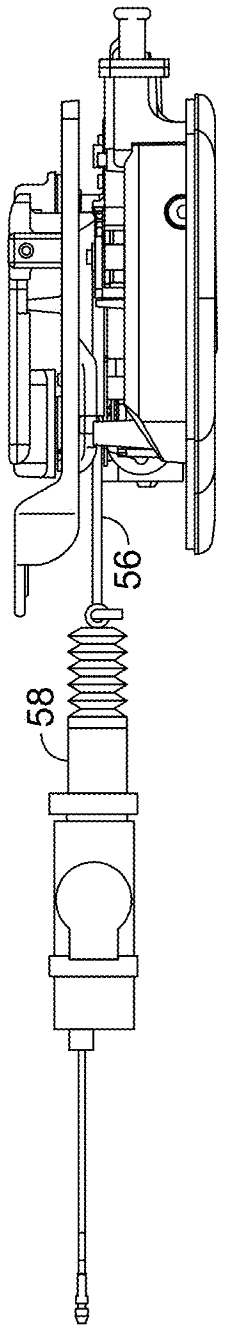
Figure 8D:
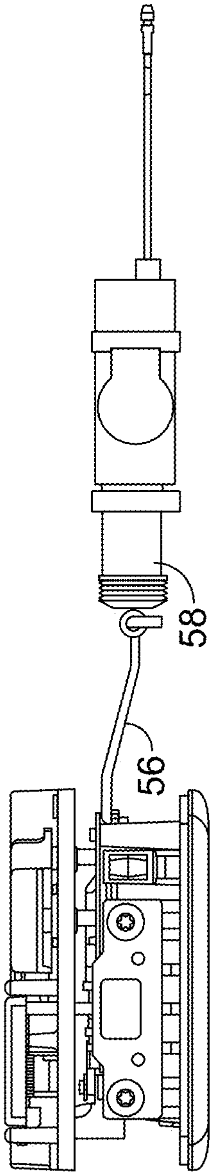
Figure 8E:
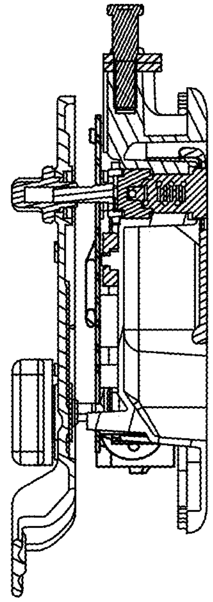
Figure 8F:
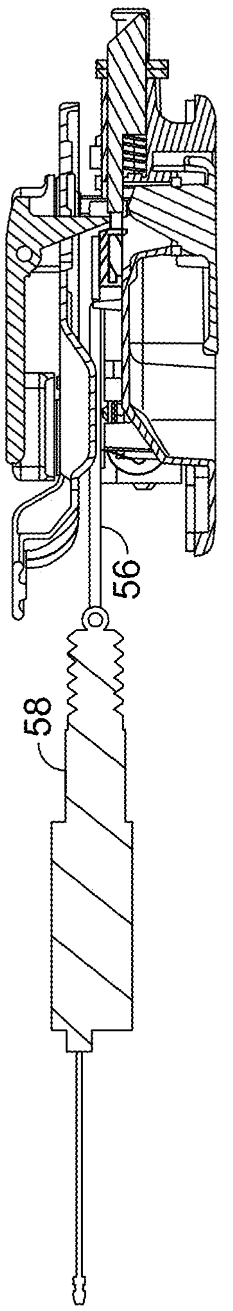
Figure 8G:
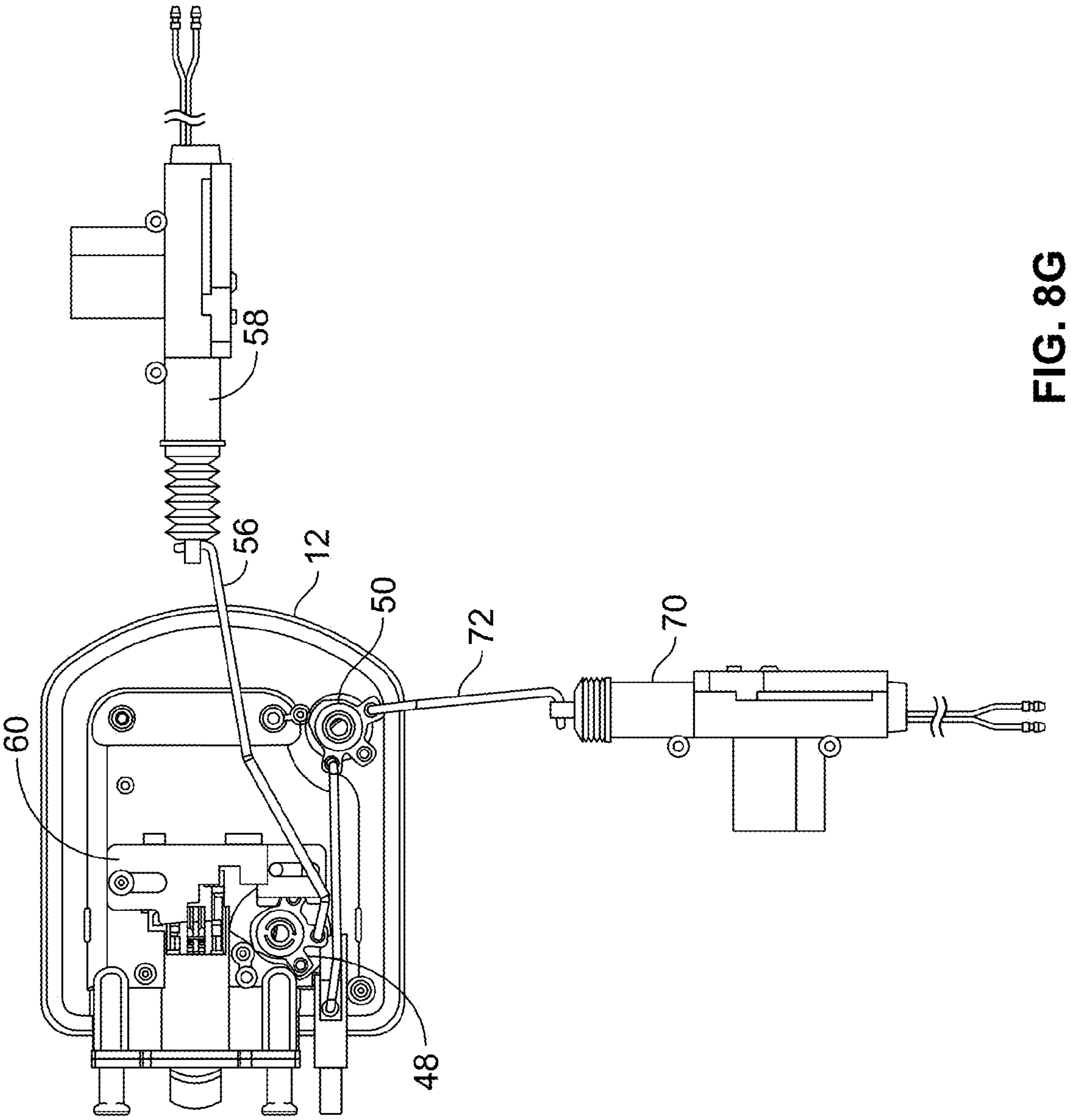
Figure 9A:
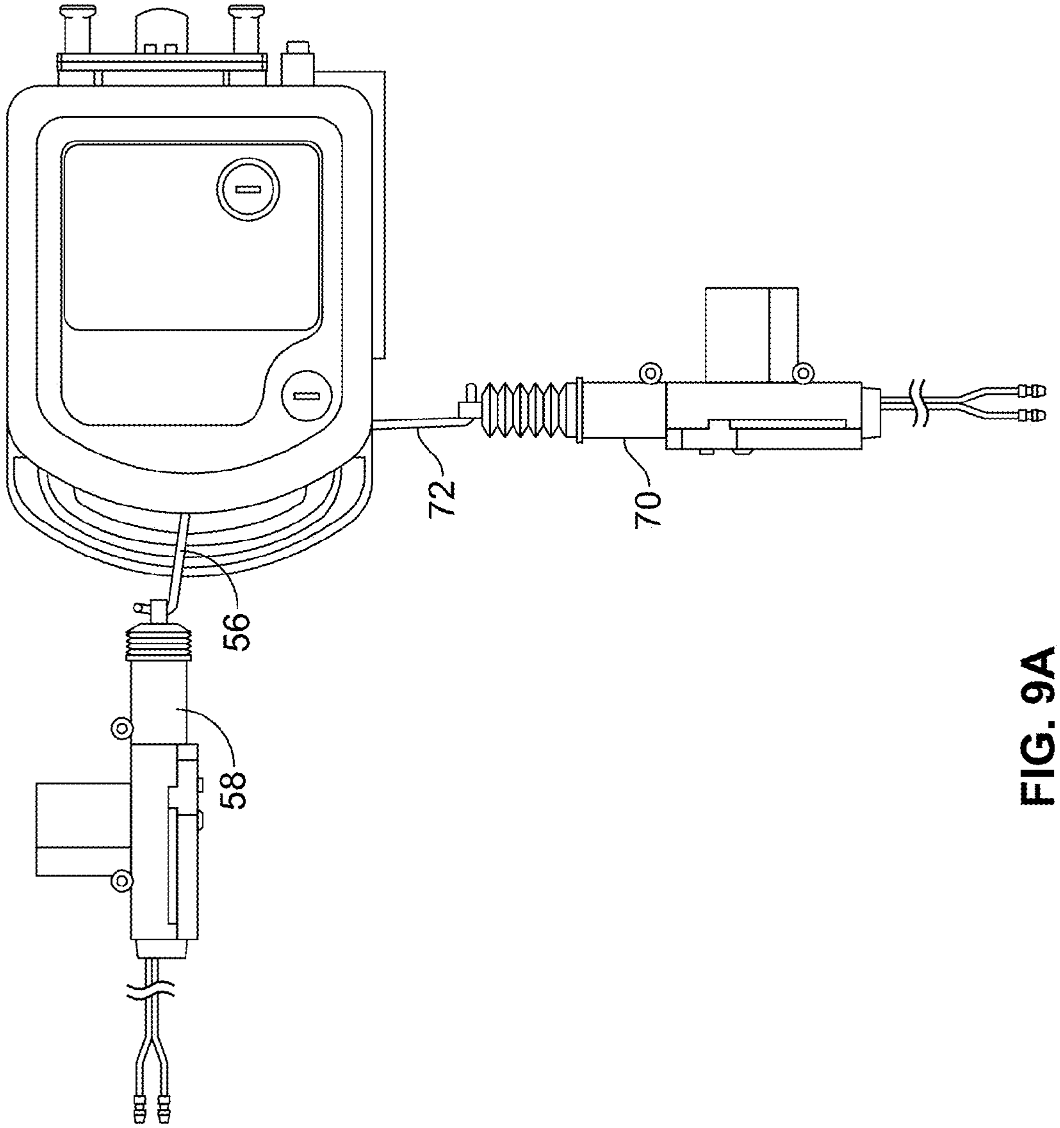
FIGS. 9A-9F are views of the assembly with power lock actuators connected for locking and unlocking the assembly, with the plunger extended and the deadbolt retracted.
Figure 9B:
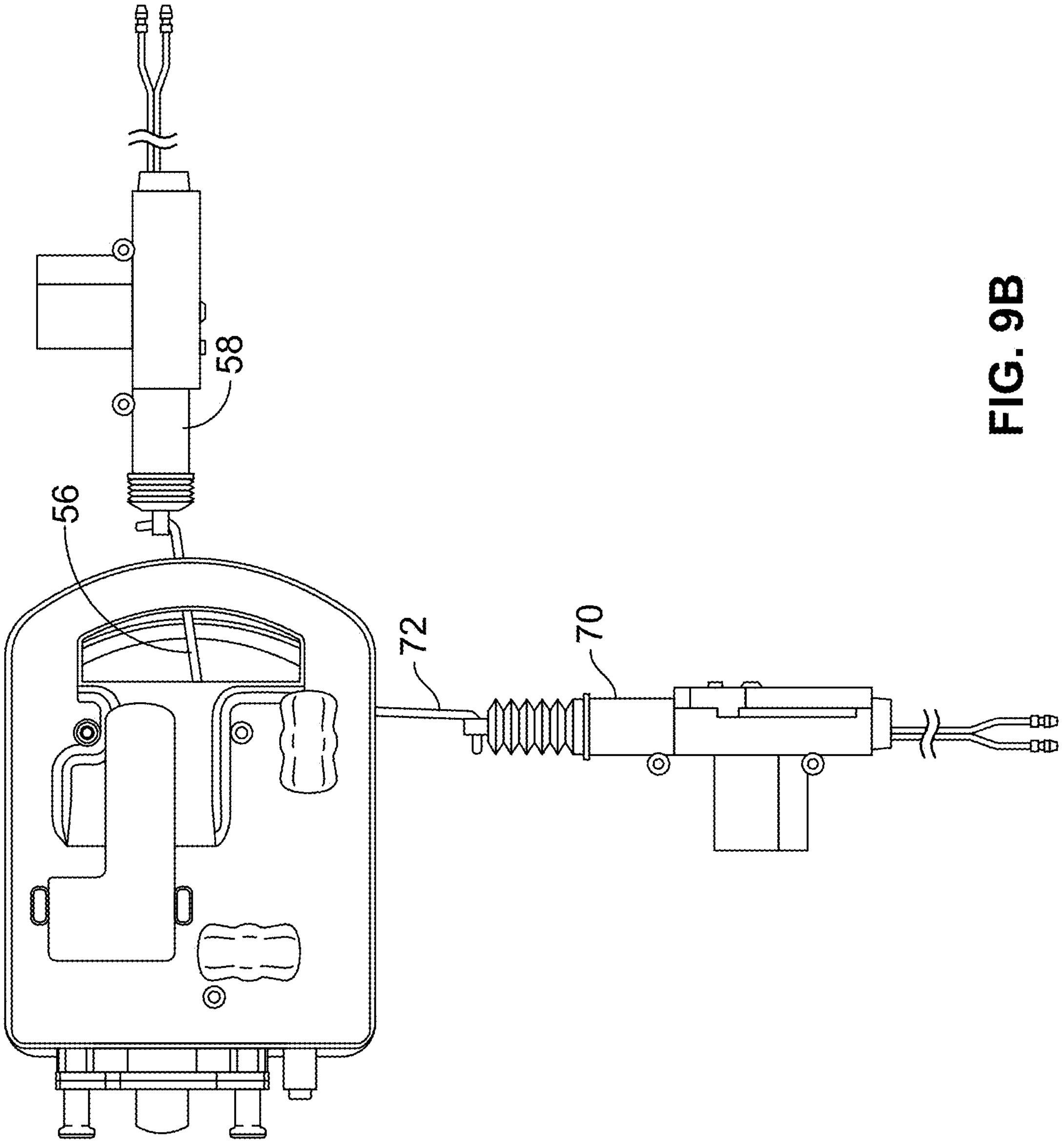
Figure 9C:
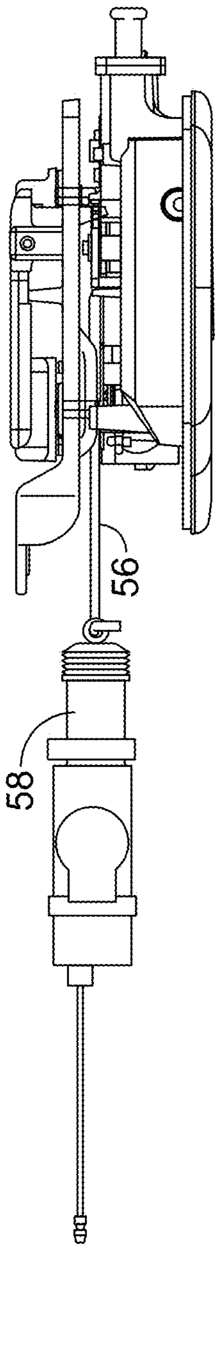
Figure 9D:
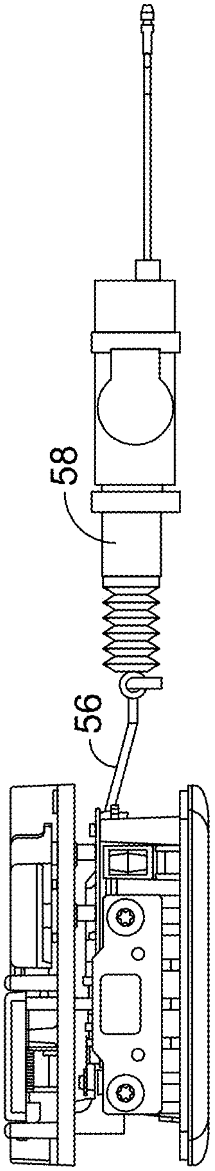
Figure 9E:
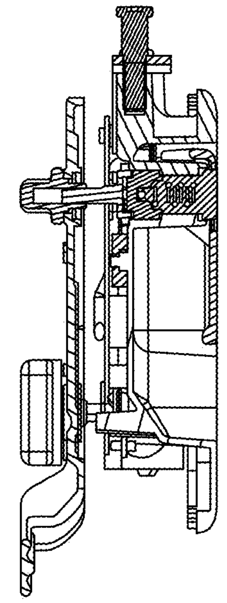
Figure 9F:
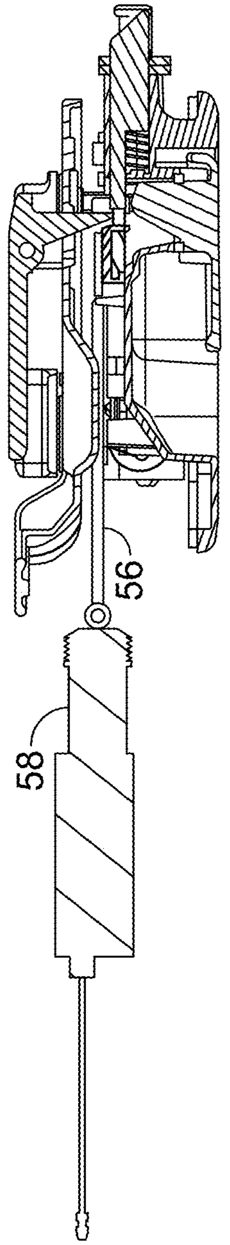
Figure 10A:
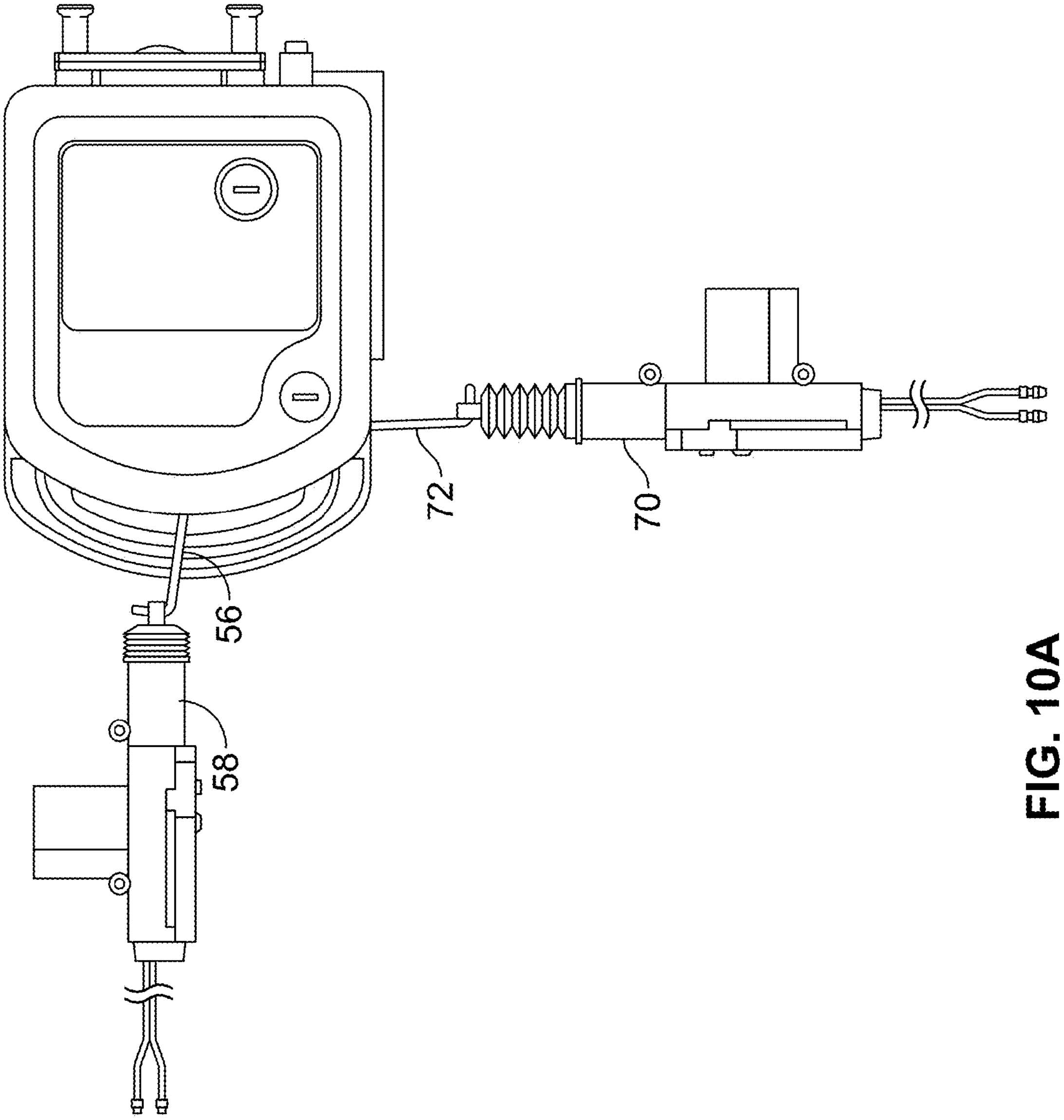
FIGS. 10A-10F show the assembly with power lock actuators attached to illustrate a slam shut door situation.
Figure 10B:
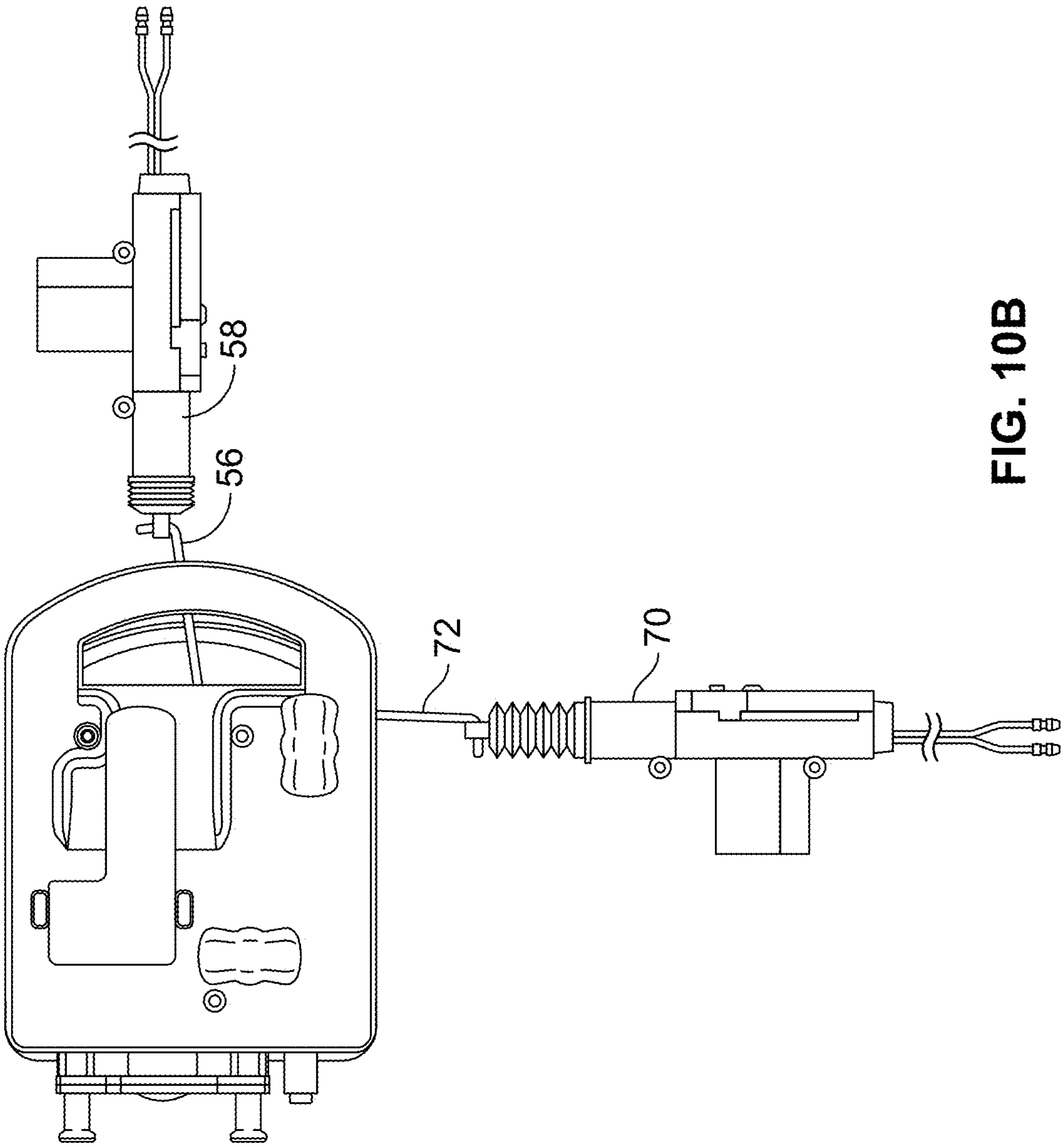
Figure 10C:
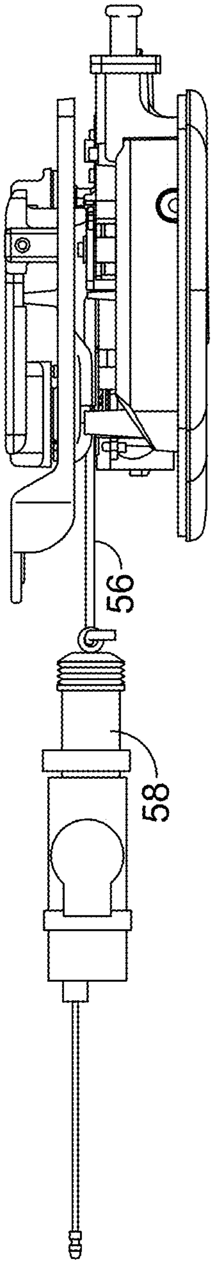
Figure 10D:
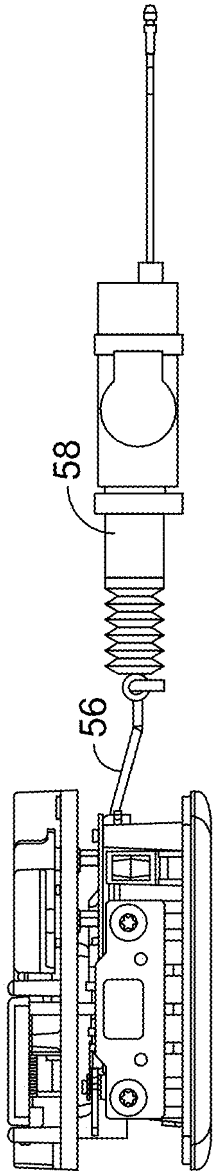
Figure 10E:
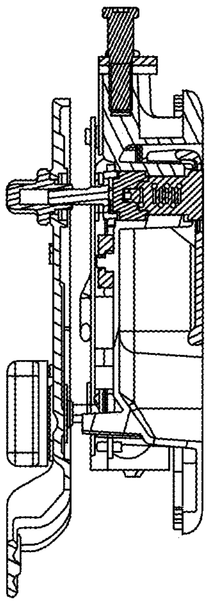
Figure 10F:
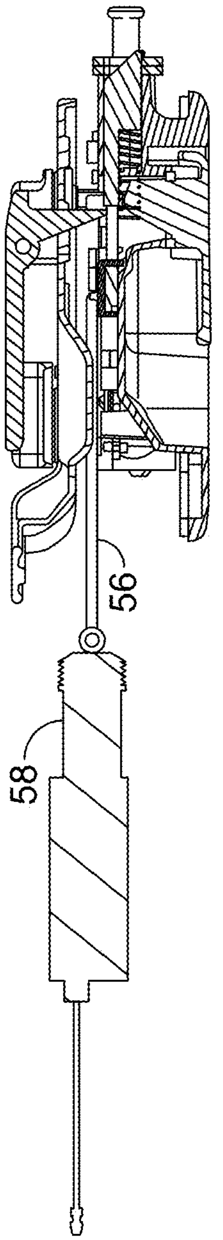
Figure 11A:
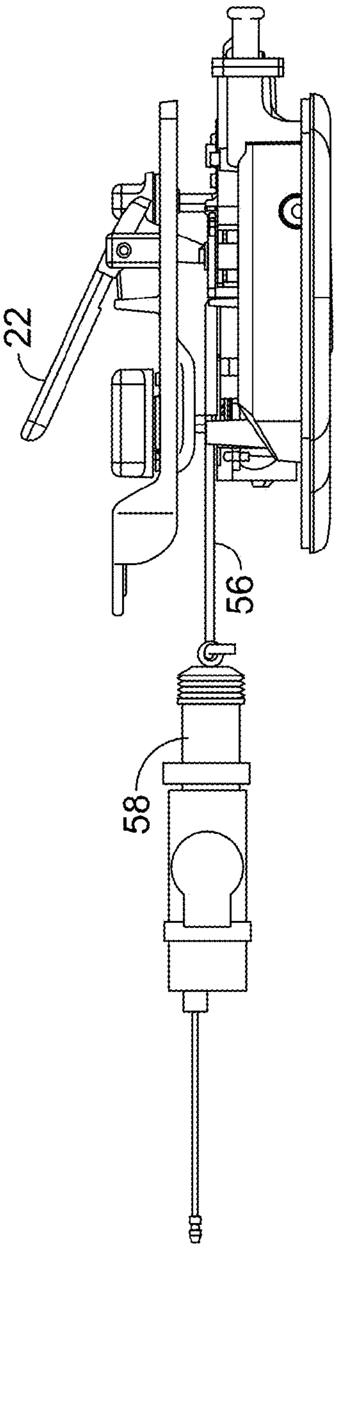
FIGS. 11A and 11B are views showing actuation of the inside door handle.
Figure 11B:
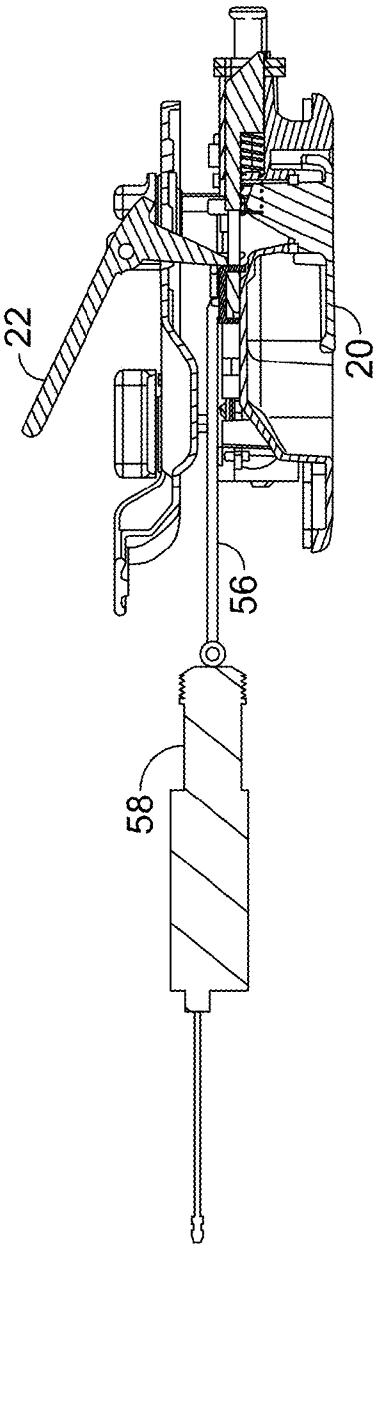
Figure 12A:
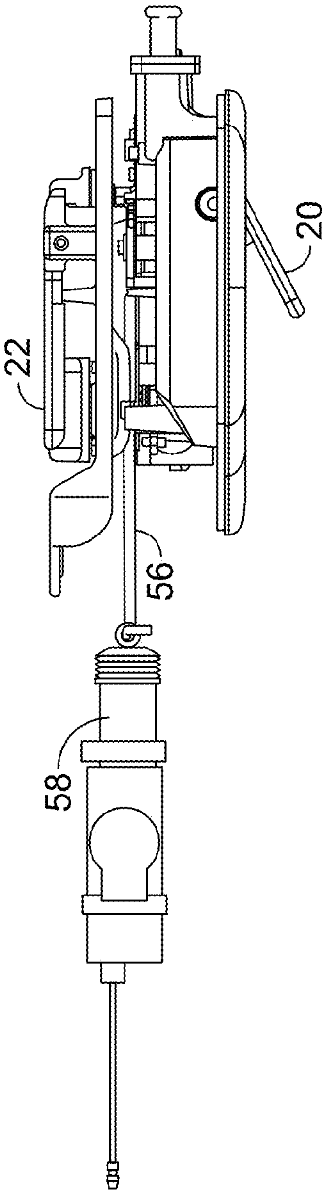
FIGS. 12A and 12B are views showing actuation of the outside door handle.
Figure 12B:
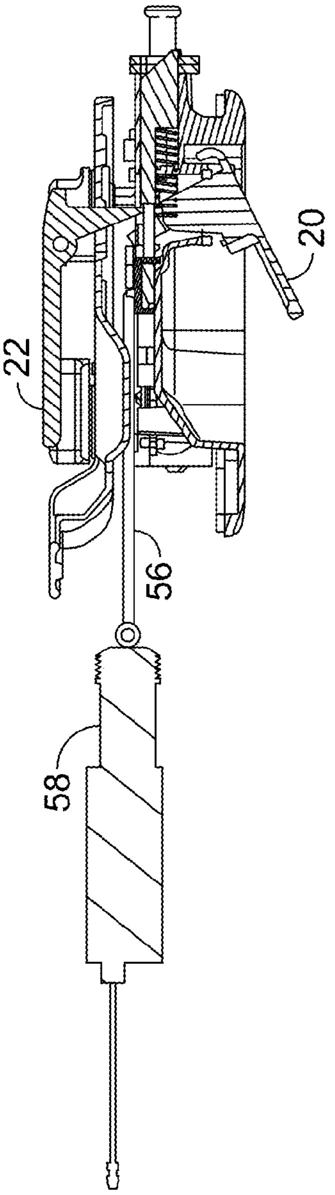
Figure 13A:
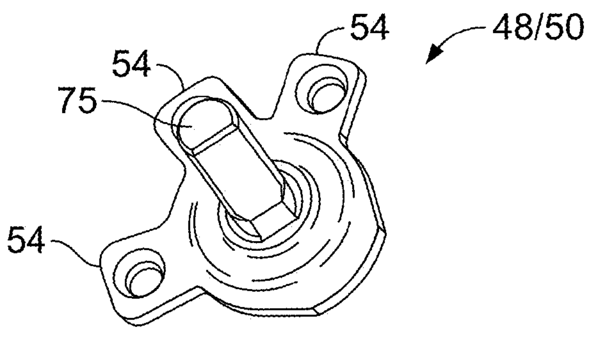
FIGS. 13A-13E are views of the plunger and deadbolt actuator of the present invention. More particularly.
Figure 13B:
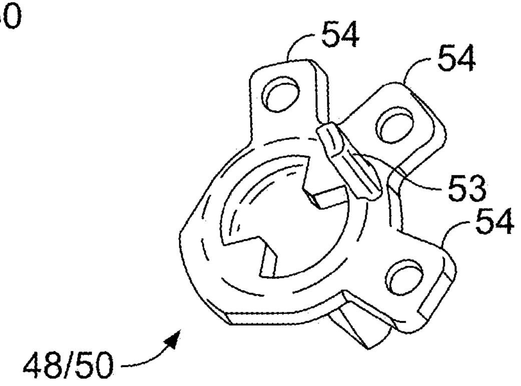
Figure 13C:
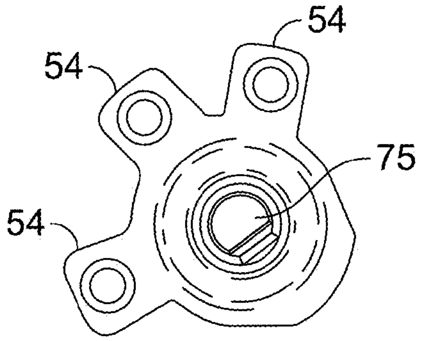
Figure 13D:
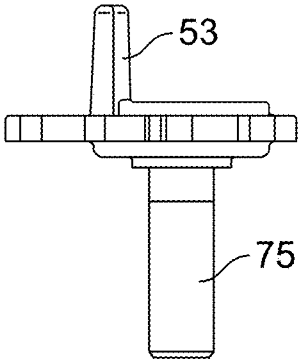
Figure 13E:
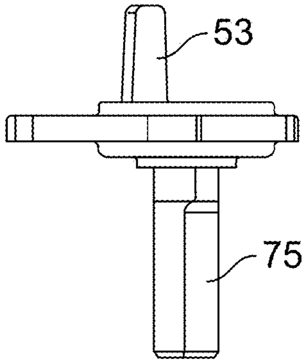
Figure 14A:
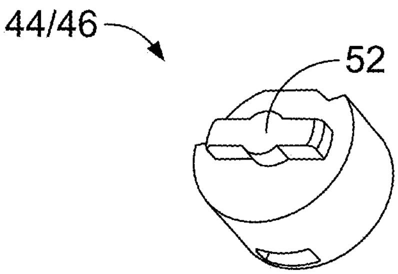
FIGS. 14A-14E are views of the intermediate actuator. More particularly.
Figure 14B:
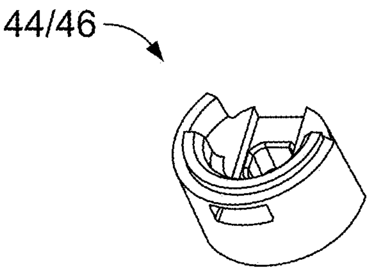
Figure 14C:
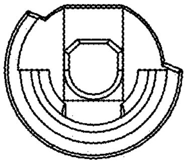
Figure 14D:
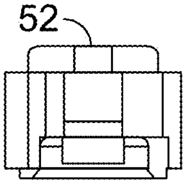
Figure 14E:
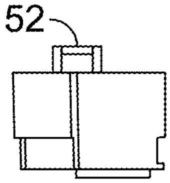

FIG. 6 shows an exploded view of the components associated with the inner housing 14. More particularly, the inner handle 22 is mounted between a pair of posts 84 on the housing 14 via a pin 86. A spring 88 on the pin 86 biases the handle 22 to a neutral or rest position. The leg 68 on the handle 22 extends through a hole 90 in the housing 14 for engagement or disengagement with respect to the slide lock arm 60 and for actuating the plunger 16 when the lock 60 is in the unlocked position. A pair of knobs 92 extends through holes 94 in the housing 14 for receipt on the D-shaped posts 75 on the plunger actuator 48 and deadbolt actuator 50. The knobs 92 can be turned manually from the inside of the door to move the lock plate 60 between the locked and unlocked positions and to move the deadbolt 18 between the extended and retracted positions.

In use, the vehicle door and handle assembly 10 can be in several states or conditions. When the door is closed, the plunger 16 is in the extended position for receipt in the doorframe to maintain the door closed. The deadbolt 18 can be either extended or retracted when the door is closed. The lock arm 60 can be in the locked or unlocked position when the door is closed. When the lock arm 60 is unlocked, both the outside handle 20 and the inside handle 22 can be actuated to retract the plunger 16 for opening the door from either outside or inside the vehicle. When the lock arm 60 is in the locked position, the steps 64 block the legs 66 and 68 on the handles 20, 22, respectively, to preclude retraction of the plunger 16 and thus prevent opening of the door.

When the door is open, the deadbolt 18 should be retracted, while the plunger 16 is biased to the extended position by the plunger spring 36. When the door is pulled, pushed, or slammed shut, the plunger 16 will retract upon engaging the doorframe, both when the lock arm 60 is locked and unlocked. If the lock arm is locked when the door is open, and then the door is closed, the lock arm 60 will remain in the locked condition to prevent unauthorized entry into the vehicle.

When the door is locked closed via the locked position of the slide arm 60, a key in the cylinder 38 can be used to move the lock arm 60 to the unlocked position, while a key in the cylinder 40 can be used to retract the deadbolt 18. Alternatively, the power units 58, 70 can be actuated using a key fob or the like, thereby unlocking the door so that the door can be opened.

The improved handle hardware assembly 10 of the present invention provides several advantages over the prior art. The multiple tabs 54 on the actuators 48, 50 allow the connecting rods 56, 72 to be coupled in different positions so as to accommodate various locations of the power units within the door. For example, the power unit 70 for the deadbolt actuator 50 can be oriented vertically from either above or below the assembly 10, or horizontally from one side of the assembly 10.

Furthermore, the locked and unlocked positions of the lock 60 are controlled alternatively by either the key cylinder 38, the power unit 58 or the inside knob 92. Also, preferably a single key operates both key cylinders 38, 40. Also, the D-shaped posts 75 on the actuators 48 and 50 are relatively short to facilitate shipping and minimize breakage before installation.

The leg 53 on the actuators 48, 50 also precludes or prevents removal of the associated cylinder 38, 40 when the cylinder is locked by an unauthorized person using an installation key, by blocking the last wafer of the cylinder. The actuators allow use of a key cylinder, such as the TriMark Corporation Key One Cylinder, which accommodates multiple codes and installation of the cylinders at locations remote from the manufacturing site for the hardware assembly 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A handle and lock assembly for a vehicle door having interior and exterior surfaces, comprising:
- an outside housing for mounting on the exterior surface of the door;
- a plunger having a longitudinal axis and being slidably mounted in the outside housing for axial movement between extended and retracted positions;
- an exterior handle pivotally mounted on the outside housing and connected to the plunger to move the plunger from the extended position to the retracted position;
- an inside housing for mounting on the interior surface of the door;
- an interior handle pivotally mounted on the inside housing and operative to move the plunger from the extended position to the retracted position;
- a lock mounted on the outside housing and movable between locked and unlocked positions;
- whereby the unlocked position of the lock allows the handle to retract the plunger; and
- whereby the locked position of the lock precludes the handle from retracting the plunger while allowing the plunger to retract when the door is moved from an open position to a closed position.

2. The assembly of claim 1 wherein the lock is a plate slidably mounted on the outside housing.

3. The assembly of claim 1 further comprising a first key cylinder on the outside housing to control movement of the lock.

4. The assembly of claim 1 further comprising a first rotatable knob on the inside housing to move the lock between the locked and unlocked positions.

5. The assembly of claim 1 further comprising a deadbolt mounted in the outside housing for movement between extended and retracted positions.

6. The assembly of claim 5 further comprising a second key cylinder on the outside housing to control movement of the deadbolt.

7. The assembly of claim 5 further comprising a second rotatable knob on the inside housing to move the deadbolt between the extended and retracted positions.

8. The assembly of claim 5 further comprising a rotatable power actuator coupled to the deadbolt for moving the deadbolt between the extended and retracted positions.

9. The assembly of claim 1 further comprising at least one reinforcement plate secured to the outside housing and having an opening through which the plunger slidably extends.

10. The assembly of claim 9 further comprising a pair of load pins extending through the plate and into the outside housing.

11. The assembly of claim 1 further comprising a power actuator coupled to the lock for moving the lock between the locked and unlocked positions.

12. A handle and lock assembly for a vehicle door having interior and exterior surfaces, comprising:

an outside housing for mounting on the exterior surface of the door;

an inside housing for mounting on the interior surface of the door;

a plunger having a longitudinal axis and being slidably mounted in the outside housing for axial movement between extended and retracted positions;

an exterior handle pivotally mounted on the outside housing and connected to the plunger to move the plunger from the extended position to the retracted position;

an exterior handle pivotally mounted on the inside housing and connected to the plunger to move the plunger from the extended position to the retracted position;

at least one reinforcement plate on the outside housing and having an opening through which the plunger slidably extends; and a pair of load pins extending through the plate and into the outside housing, and having an outer end extending beyond the plate.

13. The assembly of claim 12 further comprising a deadlock mounted in the outside housing for movement between extended and retracted positions.

14. The assembly of claim 13 further comprising:

a lock mounted on the outside housing and movable between locked and unlocked positions;

whereby the unlocked position of the lock allows the handle to retract the plunger; and whereby the locked position of the lock precludes the handle from retracting the plunger while allowing the plunger to retract when the door is moved from an open position to a closed position.

15. The assembly of claim 14 wherein the lock is a plate slidably mounted on the outside housing.

16. The assembly of claim 13 further comprising:

a first key cylinder on the outside housing to control movement of the lock; and a second key cylinder on the outside housing to control movement of the deadbolt.

17. The assembly of claim 14 further comprising a rotatable second power actuator coupled to the lock for moving the lock between the locked and unlocked positions.

18. The assembly of claim 14 further comprising a knob on the inside housing to move the lock between the locked and unlocked positions.

19. The assembly of claim 13 further comprising a rotatable first power actuator coupled to the deadbolt for moving the deadbolt between the extended and retracted positions.

20. The assembly of claim 13 further comprising a rotatable knob on the inside housing to move the deadbolt between the extended and retracted positions.

21. A handle and lock assembly for a vehicle door having interior and exterior surfaces, comprising:

inside and outside housings for mounting on the interior and exterior surfaces of the door, respectively;

a plunger having a longitudinal axis and being slidably mounted in the outside housing for axial movement between extended and retracted positions;

a deadbolt mounted in the outside housing for movement between extended and retracted positions;

intertior and exterior handles on the inside and outside housing, respectively, for sliding the plunger to the to the retracted position;

a lock mounted on the outside housing and movable between locked and unlocked positions; and a rotatable first power actuator coupled to the deadbolt for moving the deadbolt between the extended and retracted positions.

22. The assembly of claim 21 further comprising a second power actuator coupled to the lock for moving the lock between the locked and unlocked positions.

23. The assembly of claim 21 further comprising first and second knobs on the inside housing to control movement of the deadbolt and lock, respectively.

24. The assembly of claim 21:

wherein the unlocked position of the lock allows the handle to retract the plunger; and wherein the locked position of the lock precludes the handle from retracting the plunger while allowing the plunger to retract when the door is moved from an open position to a closed position.

25. The assembly of claim 21 wherein the lock is a plate slidably mounted on the outside housing.

26. The assembly of claim 21 further comprising:

a first key cylinder on the outside housing to control movement of the lock; and a second key cylinder on the outside housing to control movement of the deadbolt.

27. The assembly of claim 23 further comprising at least one reinforcement plate on the outside housing and having an opening through which the plunger slidably extends.

28. The assembly of claim 27 further comprising a pair of load pins extending through the plate and into the outside housing, and having an outer end extending beyond the plate.

* * * * *